United States Patent
Saragaglia et al.

(10) Patent No.: US 10,015,425 B2
(45) Date of Patent: Jul. 3, 2018

(54) METHOD OF INFRARED IMAGE PROCESSING FOR NON-UNIFORMITY CORRECTION

(71) Applicant: ULIS, Veurey-Voroize (FR)

(72) Inventors: Amaury Saragaglia, Eybens (FR); Alain Durand, Voiron (FR)

(73) Assignee: ULIS, Veurey-Voroize (FR)

( * ) Notice: Subject to any disclaimer, the term of this patent is extended or adjusted under 35 U.S.C. 154(b) by 323 days.

(21) Appl. No.: 14/695,539

(22) Filed: Apr. 24, 2015

(65) Prior Publication Data
US 2015/0319387 A1 Nov. 5, 2015

(30) Foreign Application Priority Data

Apr. 30, 2014 (FR) .................................... 14 53917
Apr. 22, 2015 (EP) .................................... 15164692

(51) Int. Cl.
*G01J 1/44* (2006.01)
*G01J 5/22* (2006.01)
(Continued)

(52) U.S. Cl.
CPC .............. *H04N 5/3651* (2013.01); *G01J 1/44* (2013.01); *G01J 5/22* (2013.01); *G01J 5/24* (2013.01);
(Continued)

(58) Field of Classification Search
CPC ........ H04N 5/3651; H04N 5/33; H04N 5/365; H04N 5/3656; H04N 3/09; G01J 5/22
(Continued)

(56) References Cited

U.S. PATENT DOCUMENTS 6,188,069 B1 * 2/2001 Endoh ....................... G01J 5/20
250/332
8,655,614 B2 * 2/2014 Murata ................. G01J 5/0022
382/103
(Continued)

FOREIGN PATENT DOCUMENTS

EP 2632150 2/2013
WO 2004107728 9/2004
WO WO2008081165 A1 7/2008

OTHER PUBLICATIONS

Institut National de la Propriete Industrielle, Preliminary Search Report, dated Feb. 5, 2015 for FR14/53917.

*Primary Examiner* — William C Vaughn, Jr.
*Assistant Examiner* — Jae N Noh
(74) *Attorney, Agent, or Firm* — Kevin R. Erdman; Brannon Sowers & Cracraft PC

(57) ABSTRACT

The invention concerns a method of image processing involving: receiving, by a processing device, an input image (IB) captured by a pixel array sensitive to infrared radiation; determining, based on the input image and on a column component vector (VCOL), a first scale factor ($\alpha$) by estimating a level of the column spread present in the input image; generating column offset values ($\alpha$.VCOL(y)) based on the product of the first scale factor with the values of the vector; determining, based on the input image and on a 2D dispersion matrix (IDISP), a second scale factor ($\beta$) by estimating a level of the 2D dispersion present in the input image; generating pixel offset values ($\beta$.IDISP(x,y)) based on the product of the second scale factor with the values of the matrix; and generating a corrected image (IC') by applying the column and pixel offset values.

16 Claims, 4 Drawing Sheets

(51) Int. Cl.
    *H04N 3/09*      (2006.01)
    *H04N 5/365*     (2011.01)
    *H04N 5/33*      (2006.01)
    *G01J 5/24*      (2006.01)

(52) U.S. Cl.
    CPC ................ *H04N 3/09* (2013.01); *H04N 5/33* (2013.01); *H04N 5/365* (2013.01); *H04N 5/3656* (2013.01); *G01J 2001/444* (2013.01)

(58) Field of Classification Search
    USPC ........................................................ 348/164
    See application file for complete search history.

(56) References Cited

U.S. PATENT DOCUMENTS

| | | | |
|---|---|---|---|
| 2010/0030506 A1* | 2/2010 | Cairnduff | .................. G01J 5/20 702/104 |
| 2010/0085438 A1 | 4/2010 | Richardson | |
| 2013/0022279 A1* | 1/2013 | Hogasten | ............. H04N 5/3658 382/218 |
| 2013/0218500 A1 | 8/2013 | Durand et al. | |
| 2013/0314536 A1 | 11/2013 | Frank et al. | |

* cited by examiner

METHOD OF INFRARED IMAGE PROCESSING FOR NON-UNIFORMITY CORRECTION

CROSS-REFERENCE TO RELATED APPLICATIONS

The present application claims priority under 35 U.S.C. § 119 to French application Serial Number 14/53917, filed Apr. 30, 2014, and of European patent Application Serial Number 15164692.4, filed Apr. 22, 2015, the disclosures of which are incorporated by reference herein.

BACKGROUND OF THE INVENTION

Field of the Invention

The present disclosure relates to the field of infrared image sensors, and in particular to a method and device for performing offset and gain corrections in an image captured by an array of pixels sensitive to infrared light.

Description of the Related Art

In the field of infrared (IR) imaging, performing offset correction in captured images, without the use of a shutter or shutter-like hardware, presents a major challenge for uncooled IR imaging devices, such as microbolometers, and also for cooled IR imaging devices. Such imaging devices comprise an array of IR-sensitive detectors forming a pixel array.

Spatial non-uniformity between the pixels of the pixel array, which is responsible for the offset to be corrected in the image, varies not only in time but also as a function of temperature. This problematic is generally dealt with using an internal mechanical shutter in the imaging device, and involves periodically capturing an image while the shutter is closed in order to obtain a reference image of a relatively uniform scene that can then be used for calibration. However, there are several drawbacks of using a shutter, such as the additional weight and cost, and the fragility of this component. Furthermore, for certain applications, the use of a shutter is unacceptable due to the time that is lost while the shutter is closed and calibration takes place. During this calibration period, no image of the scene can be captured.

Image processing techniques for correcting offset have been proposed as an alternative to using a shutter. However, existing techniques are complex and/or do not adequately correct the image. There is thus a need in the art for an improved method of offset correction in an infrared image.

SUMMARY

It is an aim of embodiments of the present description to at least partially address one or more needs in the prior art.

According to one aspect, there is provided a method of image processing comprising: receiving, by a processing device, an input image captured by a pixel array sensitive to infrared radiation, the pixel array having a plurality of pixel columns, each pixel column being associated with a corresponding reference pixel; determining, based on the input image and on a column component vector representing column spread introduced by the reference pixels, a first scale factor by estimating a level of said column spread present in the input image; generating column offset values based on the product of the first scale factor with the values of said vector; determining, based on the input image and on a 2D dispersion matrix representing 2D dispersion introduced by the pixel array, a second scale factor by estimating a level of said 2D dispersion present in the input image; generating pixel offset values based on the product of the second scale factor with the values of said matrix; and generating a corrected image by applying said column and pixel offset values.

According to one embodiment, the method further comprises generating a partially corrected image based on the column offset values, the second scale factor being generated based on the partially corrected image.

According to one embodiment, the column vector and dispersion matrix are determined based on a reference image representing offsets introduced by the pixel array and the associated reference pixels.

According to one embodiment, the corrected image is generated based on the equation $I_C'=I_B(x,y)-\alpha I_{COL}(x,y)-\beta I_{DISP}(x,y)$, where $I_B(x,y)$ is the input image, $\alpha$ is the first scale factor, $I_{COL}(x,y)$ is a matrix comprising in each of its rows the column vector, $\beta$ is the second scale factor, and $I_{DISP}(x,y)$ is the dispersion matrix.

According to one embodiment, the column vector represents the difference between a first column vector based on a first reference image taken at a first ambient temperature and a second column vector based on a second reference image taken at a second ambient temperature; the dispersion matrix represents the difference between a first dispersion matrix based on the first reference image and a second dispersion matrix based on the second reference image.

According to one embodiment, the corrected image is generated based on the equation: $I_C'=I_B(x,y)-I_{COL}^{T0}(x,y)-I_{DISP}^{T0}(x,y)-\alpha(I_{COL}'(x,y))-\beta(I_{DISP}'(x,y))$, where $I_B(x,y)$ is the input image, $\alpha$ is the first scale factor, $I_{COL}^{T0}(x,y)$ is a matrix comprising in each of its rows the first column vector, $I_{COL}'(x,y)$ is a matrix equal to $I_{COL}'=(I_{COL}^{T1}-I_{COL}^{T0})$, where $I_{COL}^{T1}$ is a matrix comprising in each of its rows the second column vector, $\beta$ is the second scale factor, $I_{DISP}^{T0}(x,y)$ is the first dispersion matrix and $I_{DISP}'(x,y)$ is a matrix equal to $I_{DISP}'=(I_{DISP}^{T1}-I_{DISP}^{T0})$, where $I_{DISP}^{T1}$ is the second dispersion matrix.

According to one embodiment, the method further comprises determining based on the corrected image at least one column residue offset value.

According to one embodiment, determining the at least one column residue offset value comprises: determining weights associated with at least some of the pixels of the corrected image, the weights being generated based on an estimation of the uniformity of the neighborhood of each of the at least some pixels; calculating, for each of the at least some pixels, the difference with respect to a pixel value in a corresponding row of an adjacent column; and applying the weights to the differences and integrating the weighted differences to generate the at least one column residue offset value.

According to one embodiment, the estimation of the uniformity of the neighborhood of each of the at least some pixels is based on a gradient value and on a horizontal variance value calculated for each neighborhood.

According to one embodiment, determining the first scale factor comprises: applying a high-pass filter along the rows of the image; applying the high-pass filter to the column vector; and determining column averages of the filtered image, the first scale factor being determined based on a minimization of the differences between the column averages of the filtered image and the filtered values of the column vector.

According to one embodiment, the first scale factor α is determined based on the following equation:

$$\alpha = \frac{\sum_x \left(\frac{1}{m}\sum_y T(I_B(x,y)) \times T(V_{COL}(x))\right)}{\sum_x T(V_{COL}(x)) \times T(V_{COL}(x))}$$

where T( ) represents a high pass filter applied to the column vector $V_{COL}$ and to the rows of the input image $I_B(x,y)$.

According to one embodiment, determining the second scale factor comprises: determining, for each pixel of the input image and for each element of the dispersion matrix, a gradient value based on at least one adjacent pixel, the second scale factor being determined based on a minimization of the difference between the gradients of the input image and the gradients of the dispersion matrix.

According to one embodiment, the second scale factor β is determined based on the following equation:

$$\beta = \frac{\sum (\nabla_x I_B \cdot \nabla_x I_{DISP} + \nabla_y I_B \cdot \nabla_y I_{DISP})}{\sum ((\nabla_x I_{DISP})^2 + (\nabla_y I_{DISP})^2)}$$

where $I_B$ is the input image, $I_{DISP}$ is the dispersion matrix, $\nabla_x$ is the pixel gradient value between adjacent pixels in the row direction in the input image, and $\nabla_y$ is the pixel gradient value in the column direction in the input image.

According to one embodiment, the column and pixel offset values are applied to a further input image.

According to one embodiment, the method further comprises determining a gain correction value (γ) by resolving the following minimization problem:

γ=argmin(var(Gain×$I_C$'−γ×Gain)), where var is the variance, $I_C$' is the corrected image, and Gain is a gain matrix.

According to a further aspect, there is provided an image processing device comprising: a memory storing a column vector and a dispersion matrix; a processing device adapted to: receive an input image captured by a pixel array sensitive to infrared radiation, the pixel array having a plurality of pixel columns, each pixel column being associated with a corresponding reference pixel; determine, based on the input image and on the column vector representing column spread introduced by the reference pixels, a first scale factor by estimating a level of said column spread present in the input image; generate column offset values based on the product of the first scale factor with the values of said vector, determine, based on the input image and on the dispersion matrix representing 2D dispersion introduced by the pixel array, a second scale factor by estimating a level of said 2D dispersion present in the input image; generate pixel offset values based on the product of the second scale factor with the values of said matrix; and generate a corrected image by applying the column and pixel offset values.

BRIEF DESCRIPTION OF THE DRAWINGS

The foregoing and other features and advantages will become apparent from the following detailed description of embodiments, given by way of illustration and not limitation with reference to the accompanying drawings, in which.

Figure 1:
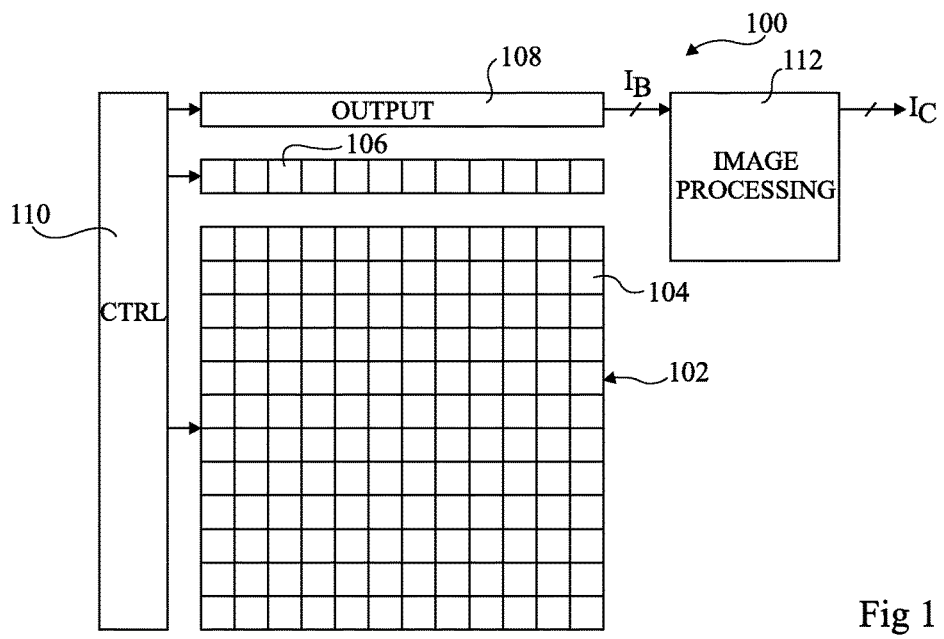
FIG. 1 schematically illustrates an imaging device according to an example embodiment.

Corresponding reference characters indicate corresponding parts throughout the several views. Although the drawings represent an example embodiment of the present invention, the drawings are not necessarily to scale and certain features may be exaggerated in order to better illustrate and explain the present invention. The flow diagrams and schematics are also representative in nature, and actual embodiments of the invention may include further features or steps not shown in the drawings. The exemplification set out herein illustrates an example embodiment of the invention, in one form, and such exemplifications are not to be construed as limiting the scope of the invention in any manner.

DETAILED DESCRIPTION

While some of the embodiments in the following description are described in relation to a pixel array of the microbolometer type, it will be apparent to those skilled in the art that the methods described herein could be equally applied to other types of IR imaging devices, including cooled devices.

FIG. 1 illustrates an IR imaging device 100 comprising a pixel array 102 sensitive to IR light. For example, in some embodiments the pixel array is sensitive to long-wave IR light, such as light with a wavelength of between 7 and 13 μm.

For ease of illustration, a pixel array 102 of only 144 pixels 104, arranged in 12 rows and 12 columns, is illustrated in FIG. 1. In alternative embodiments the pixel array 102 could comprise any number of rows and columns of pixels. Typically, the array for example comprises 640 by 480, or 1024 by 768 pixels.

Each column of pixels of the array 102 is associated with a corresponding reference structure 106. Though not functionally a picture element, this structure will be referred to herein as a "reference pixel" by structural analogy with the imaging (or active) pixels 104. Furthermore, an output block 108 is coupled to each column of the pixel array 102 and to each of the reference pixels 106, and provides a raw image $I_B$.

A control circuit 110 for example provides control signals to the pixel array, to the reference pixels 106, and to the output block 108. The raw image $I_B$ is for example provided to an image processing block 112, which applies offsets and gains to the pixels of the image to produce a corrected image $I_C$.

Figure 2:
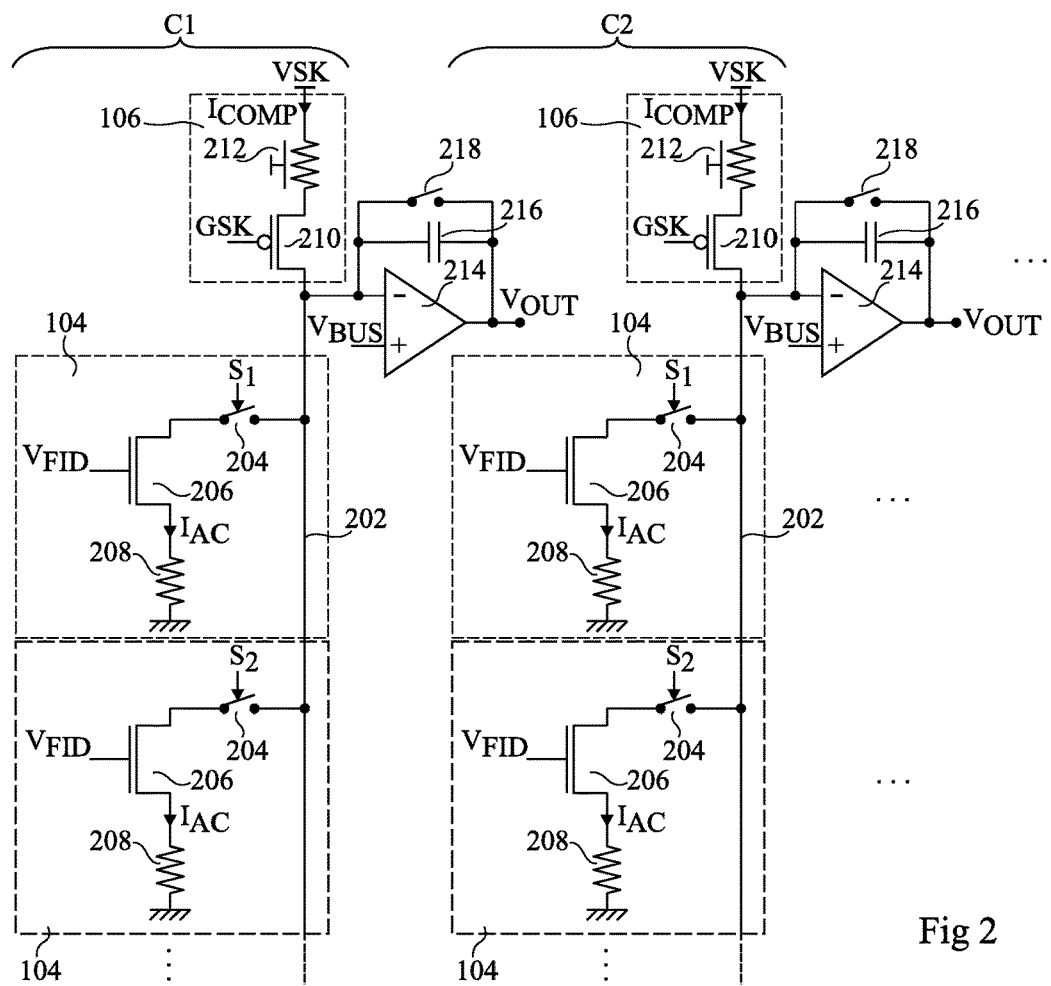
FIG. 2 schematically illustrates part of a pixel array of the imaging device of FIG. 1 in more detail according to an example embodiment.

FIG. 2 illustrates two columns C1 and C2 of the pixel array 102 and their associated reference pixels and output circuits in more detail according to an example in which the imaging device is a microbolometer.

Each column of pixels of the pixel array 102 is coupled to a respective column line 202. For example, each pixel 104 comprises a switch 204, a transistor 206 and a bolometer 208 coupled in series between the corresponding column line 202 and a ground node.

Bolometers are well known in the art, and for example comprise a membrane suspended over a substrate, comprising a layer of IR absorbing material and having the property that their resistance is modified by the temperature rise of the membrane related to the presence of IR radiation.

The switches 204 of the pixels of each row are for example controlled by a common selection signal. For example, in FIG. 2, a first row of pixels is controlled by a control signal S1, and a second row of pixels is controlled by a control signal S2.

The transistors 206 are for example NMOS transistors receiving at their gates a biasing voltage $V_{FID}$ for controlling the potential drop across the active bolometers, by inducing a steady voltage at one of its ends, the other end being grounded.

The reference pixel 106 associated with each column comprises a transistor 210 and a blind bolometer 212 coupled in series between the corresponding column line 202 and a skimming voltage VSK. The skimming voltage VSK sets the highest potential of the bolometer bridge formed by the active and reference pixels by inducing a steady voltage at one end of the reference bolometer. The transistor 210 is for example a PMOS transistor receiving at its gate a biasing voltage GSK for controlling the potential drop across the blind bolometer by inducing a steady voltage at the other end of the blind bolometer.

The blind bolometers 212 for example have a similar structure to the active bolometers 208 of the pixel array, but are rendered insensitive to radiation from the image scene, for example by a shield formed of a reflective barrier and/or by heat sinking by design, e.g. by providing a high thermal conductance to the substrate, the bolometer for example being formed in direct contact with the substrate.

Each column line 202 is further coupled to an output circuit forming part of the output block 108 of FIG. 1. In the example of FIG. 2, each output circuit comprises a capacitive transimpedance amplifier (CTIA) 214 having its negative input terminal coupled to the corresponding column line 202, and its positive input terminal receiving a reference voltage $V_{BUS}$. The output of the amplifier 214 provides an output voltage $V_{OUT}$ of the column. A capacitor 216 and a switch 218 are coupled in parallel with each other between the negative input terminal and output terminal of the amplifier 214.

During a read operation of the pixel array 102, the rows of pixels are for example read out one at a time, by activating and deactivating the switch 218 of each output circuit of the output block 108 to reset the voltage on the capacitor 216, and activating the appropriate selection signal S1, S2, etc. of the row to be read. The difference between the current $I_{COMP}$ in the reference pixel and the current $I_{AC}$ in the active pixel is integrated by the capacitor 216 over a finite integration time to produce an output voltage $V_{OUT}$ representing the pixel value.

Figure 3:
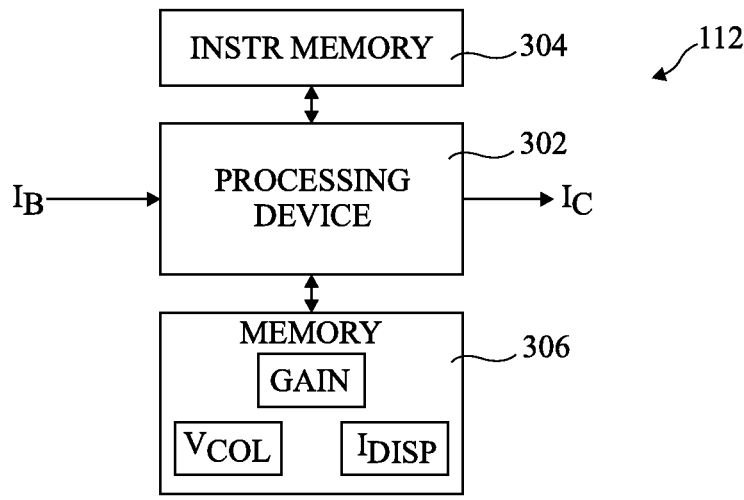
FIG. 3 schematically illustrates an image processing block of the imaging device of FIG. 1 in more detail according to an example embodiment.

FIG. 3 illustrates the image processing block 112 of FIG. 1 in more detail according to an example embodiment.

The functions of the image processing block 112 are for example implemented in software, and the image processing block 112 comprises a processing device 302 having one or more processors under the control of instructions stored in an instruction memory 304. In alternative embodiments, the functions of the image processing block 112 could be implemented at least partially by dedicated hardware. In such a case, the processing device 302 for example comprises an ASIC (application specific integrated circuit) or FPGA (field programmable gate array), and the instruction memory 304 may be omitted.

The processing device 302 receives the raw input image $I_B$, and generates the corrected image $I_C$, which is for example provided to a display (not illustrated) of the imaging device. The processing device 302 is also coupled to a data memory 306 storing a vector $V_{COL}$ representing a structural column spread introduced by the pixel array 102, and a matrix $I_{DISP}$ representing a 2D non-column structural dispersion introduced by the pixel array 102. The column spread for example principally results from the use of the reference pixel 106 in each column, whilst the row of column reference pixels is generally not perfectly uniform. The 2D non-column dispersion for example principally results from local physical and/or structural differences between the active bolometers of the pixel array resulting for example from technological process dispersion. The data memory 306 for example also stores a gain matrix, discussed in more detail below.

Figure 4:
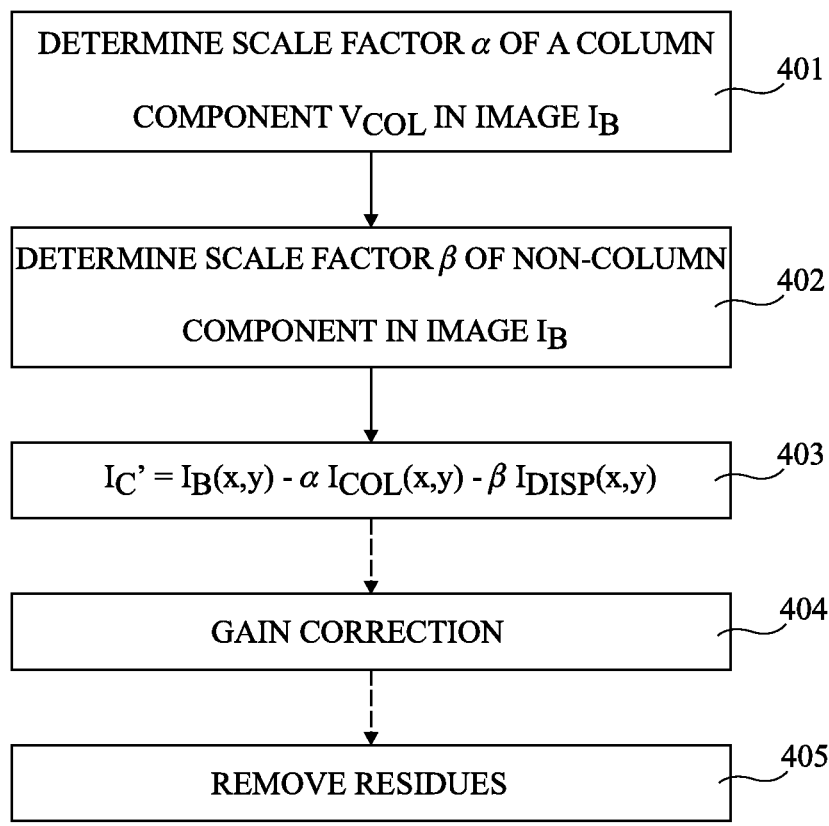
FIG. 4 is a flow diagram showing operations in a method of imaging processing according to an example embodiment.

FIG. 4 is a flow diagram illustrating operations in a method of image processing according to an example embodiment. This method is for example implemented by the image processing block 112 described above.

It is assumed that a raw image $I_B$ has been captured by the pixel array 102 of FIG. 1, and that the pixel array is of the type that each column of the array is associated with a corresponding reference pixel.

Furthermore, it is assumed that the column vector $V_{COL}$ and 2D dispersion matrix $I_{DISP}$ are available. The column vector $V_{COL}$ and 2D dispersion matrix $I_{DISP}$ are for example generated based on a single reference image $I_{REF}(x,y)$ captured during an initial set-up phase of the imaging device. The reference image is for example one that was captured in front of a black-body source or a uniform emissive scene and at a controlled temperature. Mainly in order to cancel temporal noise, the reference image is for example obtained by averaging a plurality of frames, such as around 50 frames. This reference image $I_{REF}(x,y)$ is for example considered to have structural column and 2D dispersion components according to the following relation:

$$I_{REF}(x,y) = I_{COL}(x,y) \oplus I_{DISP}(x,y)$$

where $I_{COL}(x,y)$ is a matrix representing reference column spread among the columns of the pixel array, and $I_{DISP}(x,y)$ is the matrix representing the reference 2D dispersion for each pixel of the pixel array.

The matrix $I_{COL}$ can be represented by the vector $V_{COL}$, which has a length equal to the number n of columns in the image. For example, the matrix $I_{COL}(x,y)$ has a number m of rows equal to the number of rows of the image, and each row comprises the vector $V_{COL}$. The generation of the vector $V_{COL}$ for example involves processing the reference image $I_{REF}$ to extract the column component. This is for example equal, for each column, to the mean of the pixel values of the column. The generation of the matrix $I_{DISP}$ for example involves subtracting, from each pixel value of the reference image, the corresponding column spread value $V_{COL}(x)$.

In a first operation 401 of FIG. 4, a scale factor α is determined, for the raw image $I_B$, representing the level of the column spread $V_{COL}$ in the image $I_B$. In one embodiment, the value of the scale factor α is determined based on a minimisation of the amount of the column component $I_{COL}$ in the image $I_B$. This can be expressed as the following minimization function:

$$\alpha = \mathrm{argmin}_{\alpha \in \mathbb{R}} \sum_{x,y} (I_B(x,y) - \alpha \times I_{COL}(x,y))^2$$

where $\mathrm{argmin}_{\alpha \in \mathbb{R}} f(\alpha)$ is the argument for which the given function attains its minimum value. As indicated above, the matrix $I_{COL}(x,y)$ can be represented as a vector $V_{COL}(x)$, as it defines a single value for each column. To facilitate resolving this minimization problem, and also to simplify the calculation, the raw image $I_B$ is also for example placed in the form of a vector by taking an average of each column. Furthermore, a high pass filter is for example applied horizontally in the image, in other words in the direction of the rows, and also to the vector $V_{COL}(x)$. The minimization problem is then for example calculated based on the average of the columns of the transformed image, as follows:

$$\alpha = \mathrm{argmin}_{\alpha \in \mathbb{R}} \sum_{x} \left[ \left( \frac{1}{m} \sum_{y} T(I_B(x,y)) \right) - \alpha \times T(V_{COL}(x)) \right]^2$$

where $T(\ )$ represents a high pass filter applied to the column vector $V_{COL}$ and to the input image $I_B(x,y)$, and m is the number of rows in the image.

For example, the filter function is defined as $T(X)=X*hp$, in other words the convolution of the matrix X with a horizontal high pass filter hp. In one example, the filter function hp is defined by the coefficients [0.0456 −0.0288 −0.2956 0.5575 −0.2956 −0.0288 0.0456], applied to a central pixel within a local window along the x dimension. More generally, the filter is for example a high pass filter adapted to sharpen vertical edges in the image, in other words to extract the column noise.

The minimization problem is for example resolved based on the following direct solution for the scale factor $\alpha$:

$$\alpha = \frac{\sum_{x} \left( \frac{1}{m} \sum_{y} T(I_B(x,y)) \times T(V_{COL}(x)) \right)}{\sum_{x} T(V_{COL}(x)) \times T(V_{COL}(x))}$$

In other words, the determination of the scale factor $\alpha$ for example involves applying the high-pass filter to the raw image along its rows and also to the reference column vector; determining column averages of the filtered image, resulting in a vector of the same size as the reference column vector, and then determining the scale factor as the minimization of the differences between the two column vectors, i.e. between the column averages of the filtered image and the filtered column vector.

As will be described in more detail below, the scale factor $\alpha$ permits column offset values $\alpha.I_{COL}(x,y)$ to be determined for the image.

Referring again to FIG. 4, in a subsequent operation 402, a scale factor $\beta$ is determined, for the raw image $I_B$, representing the contribution level of the reference 2D dispersion component $I_{DISP}$ in the image.

In order to determine the scale factor $\beta$, it is assumed that the images captured are natural images, for example with natural scene statistics, and that localized high variations between pixels, i.e. the variations between a pixel and its neighbourhood, are the result of fixed 2D dispersion. A value of the scale factor $\beta$ is for example determined so as to reduce the impact of this dispersion across the whole image. The approach adopted is for example to minimize the total variation (TV) in the image, based on the following equation:

$$\beta = \mathrm{argmin}_{\beta} TV(I_B(\beta)) = \mathrm{argmin}_{\beta} \sum_{x,y} |\nabla(I_B - \beta \times I_{DISP})|$$

where $\nabla(\ )$ is the pixel gradient value. As a good approximation of the minimization problem, it is for example treated as the minimization of $$\beta = \mathrm{argmin}_{\beta} \sum_{x,y} |\nabla(I_B - \beta \times I_{DISP})|^2$$

Such a minimization problem is for example resolved based on the following direct solution for the scale factor $\beta$:

$$\beta = \frac{\sum (\nabla_x I_B \cdot \nabla_x I_{DISP} + \nabla_y I_B \cdot \nabla_y I_{DISP})}{\sum ((\nabla_x I_{DISP})^2 + (\nabla_y I_{DISP})^2)}$$

where $\nabla_x$ is the pixel gradient value between adjacent pixels in the horizontal direction in the image, in other words along each row, and $\nabla_y$ is the pixel gradient value between adjacent pixels in the vertical direction in the image, in other words along each column.

The operation 402 therefore involves determining, for each pixel of the raw input image and for each element of the reference 2D dispersion matrix, a gradient value based on at least one adjacent pixel; and determining the scale factor $\beta$ based on a minimization of the difference between the gradients of the raw input image and the gradients of the reference 2D dispersion matrix.

In this example, the scale factor $\beta$ is determined based on the raw image $I_B$. However, in alternative embodiments, the scale factor $\beta$ can be determined based on an image after the column offsets $\alpha.I_{COL}(x,y)$ have been removed. The direct solution for the scale factor $\beta$ thus becomes:

$$\beta = \frac{\sum (\nabla_x I_{CC} \cdot \nabla_x I_{DISP} + \nabla_y I_{CC} \cdot \nabla_y I_{DISP})}{\sum ((\nabla_x I_{DISP})^2 + (\nabla_y I_{DISP})^2)}$$

where $I_{CC}$ is the image in which each pixel (x,y) has been corrected, for example based on the following equation:

$$I_{CC}(x,y) = I_B(x,y) - \alpha \times I_{COL}(x,y)$$

where $I_{COL}(x,y)$ is the matrix comprising, in each of its rows, the column vector $V_{COL}(x)$.

In some embodiments, in the calculation of operation 402, only pixel gradient values that are below an upper threshold are taken into account. Indeed, it is for example assumed that very high gradients correspond to edges related to the scene in the image. For example, this upper threshold is chosen to be around three times the highest gradient value computed for the reference dispersion matrix $I_{DISP}$.

In a subsequent operation 403, a corrected image $I_C'$ is generated based on the column offset values equal to $\alpha.I_{COL}(x,y)$, and the pixel offset values equal to $\beta.I_{DISP}(x,y)$. For example, the corrected image is calculated as:

$$I_C' = I_B(x,y) - \alpha I_{COL}(x,y) - \beta I_{DISP}(x,y)$$

In the embodiment described above, the corrected image is based on the components $I_{COL}$ and $I_{DISP}$ taken from a single reference image $I_{REF}$. In alternative embodiments, in order to increase the precision of the reference correction, two reference images have for example been captured at different detector temperatures T0 and T1 respectively, instead of a unique reference image, and the device for example stores in the memory 306 of FIG. 3 a first set of components $I_{COL}^{T0}$ and $I_{DISP}^{T0}$ based on the reference image taken at T0, and a second set of components $I_{COL}^{T1}$ and $I_{DISP}^{T1}$ based on the reference image taken at T1. In such a case, the values of the scalars $\alpha$ and $\beta$ are for example determined using these components by subtracting directly the first component from the input image $I_B(x,y)$ and, for example, by computing $\alpha$ and $\beta$ in the same way as descried in relation to operations 401 and 402, but based on a structural column component $I'_{COL}(I_{COL}^{T1} - I_{COL}^{T0})$ and a 2D dispersion component $I'_{DISP}(I_{DISP}^{T1} - I_{DISP}^{T0})$. The corrected image $I_C'$ is then for example determined as:

$$I_C' = I_B(x,y) - I_{COL}^{T0}(x,y) - I_{DISP}^{T0}(x,y) - \alpha(I_{COL}'(x,y)) - \beta(I_{DISP}'(x,y))$$

In some embodiments, the operations 401 to 403 may provide sufficient offset correction, in which case the corrected image $I_C'$ provides the image $I_C$ at the output of the image processing block 112 of FIG. 1. In alternative embodiments, an additional operation 404 and/or an additional operation 405 are for example subsequently performed to generate the final image $I_C$.

In operation 404, gain correction is for example applied to the image by calculating an image correction factor $\gamma$ from the corrected image $I_C'$ before subtracting it from this image and multiplying each pixel value of the result by the gain matrix. For example, this gain correction value is obtained by resolving the following minimization problem:

$$\gamma = \mathrm{argmin}(\mathrm{var}(\mathrm{Gain} \times I_C' - \gamma \times \mathrm{Gain}))$$

The direct solution for the image correction factor $\gamma$ thus becomes:

$$\gamma = \frac{\overline{\mathrm{Gain}^2 \times I_C'} - \overline{\mathrm{Gain}} \times \overline{I_C'} \times \overline{\mathrm{Gain}}}{\mathrm{var}(\mathrm{Gain})}$$

where $\overline{X}$ is the mean of matrix X, and Gain is the gain matrix, which is for example stored in the memory 306 along with the vector $V_{COL}$ and matrix $I_{DISP}$. Such a gain matrix is for example' determined, as is usual for those skilled in the art, from the difference between two reference images captured in front of a uniform source, such as a black body source, at two different temperatures.

A corrected image $I_C''$ is then generated based on the multiplication of the corrected image by the gain. For example, the corrected image $I''_C$ is calculated as:

$$I_C'' = (I_C' - \gamma) \times \mathrm{Gain}$$

In operation 405, offset residues, such as column residues and/or dispersion residues, remaining in the image, are for example removed.

Figure 5:
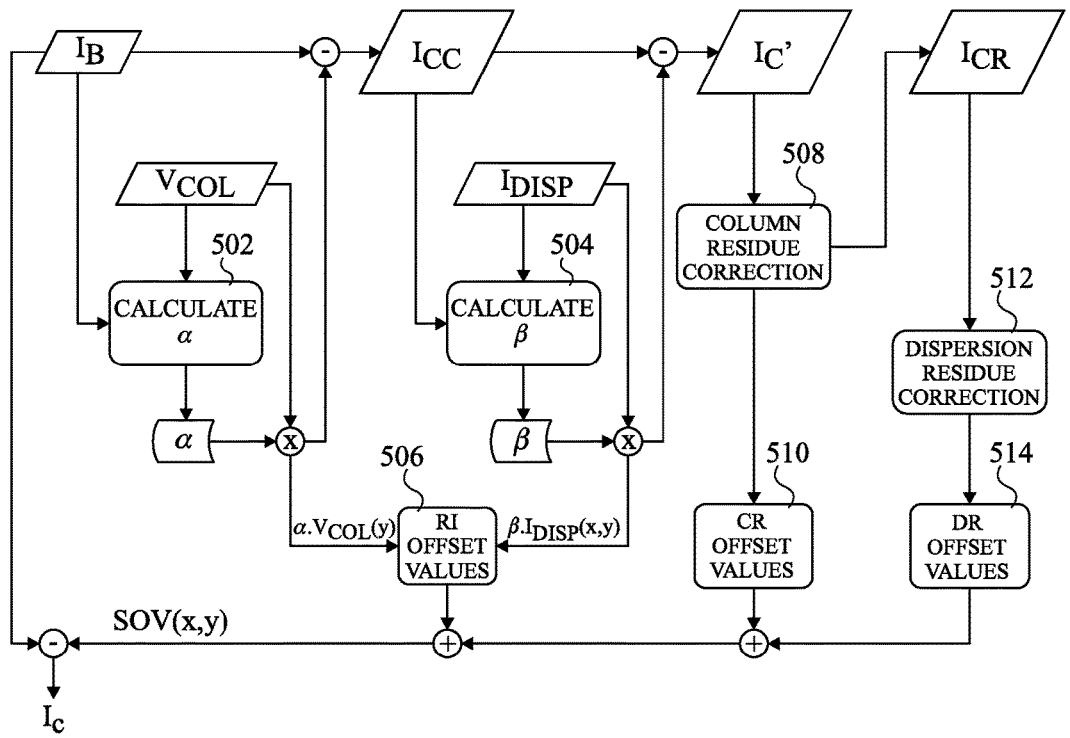
FIG. 5 is a flow diagram illustrating operations in a method of processing an image according to a further example embodiment.

FIG. 5 is a flow diagram illustrating operations in a method of offset correction in an image according to a further example embodiment.

As represented by a process block (CALCULATE $\alpha$) 502, the input image $I_B$ and column vector $V_{COL}$ are for example used to generate the scale factor $\alpha$. The vector $V_{COL}$ is then multiplied by the scale factor $\alpha$ to generate the column offset values $\alpha.V_{COL}(y)$. These offset values are then subtracted from the raw image $I_B$ to provide the column spread corrected image $I_{CC}$.

As represented by a process block (CALCULATE $\beta$) 504, the column spread corrected image $I_{CC}$ and the dispersion matrix $I_{DISP}$ are for example used to generate the scale factor $\beta$. The matrix $I_{DISP}$ is then multiplied by the scale factor $\beta$ to generate the pixel offset values $\beta.I_{DISP}(x,y)$. These offset values are then subtracted from the image $I_{CC}$ to generate the corrected image $I_C'$.

Furthermore, the offset values $\alpha.V_{COL}(y)$ and $\beta.I_{DISP}(x,y)$ are for example added together to provide reference image offset values (RI OFFSET VALUES) 506.

While not illustrated in FIG. 5, gain correction as described above in relation to operation 404 of FIG. 4 is optionally then applied to the corrected image $I_C'$, and the image correction factor $\gamma$ is applied to the image.

As represented by a process block 508, column residue correction is then for example performed based on the corrected image $I_C'$, in order to generate column residue correction values (CR OFFSET VALUES) 510, and a column residue corrected image $I_{CR}$. Indeed, some offsets associated with the column circuitry of each column can still be present in the image, potentially leading to visible vertical stripes in the image. The column residue correction is for example performed to remove these column artefacts.

As represented by a process block 512, 2D dispersion residue correction is then for example performed based on the column residue corrected image $I_{CR}$ to generate 2D dispersion residue offset values (DR OFFSET VALUES) 514. The dispersion residue correction is for example achieved using an edge-preserving and noise reducing smoothing filter, such as an anisotropic diffusion filter.

In the example of FIG. 5, the offset values 506, 510 and 514 are summed together to provide summed offset values SOV(x,y) to be applied to the image. These offset values SOV(x,y) are then subtracted from the raw image $I_B$. However, an advantage of determining the summed offset values SOV(x,y) is that these offsets may be applied to a different image than the one used to generate them. For example, in the case that the raw image $I_B$ is a frame of a video sequence being captured by the imaging device, the offset values SOV(x,y) are for example subtracted from a subsequent image in the sequence. This leads to a reduction in the time delay between the raw image being captured and the corrected image becoming available.

In alternative embodiments, the reference image offsets 506 are applied to a current or subsequent raw image, gain correction is performed on the resulting image $I_C'$, and the column and dispersion offset residue values are for example then applied to the gain corrected image.

The column residue correction performed in operation 508 of FIG. 5 will now be described in more detail with reference to the flow diagrams of FIGS. 6 and 7.

Figure 6:
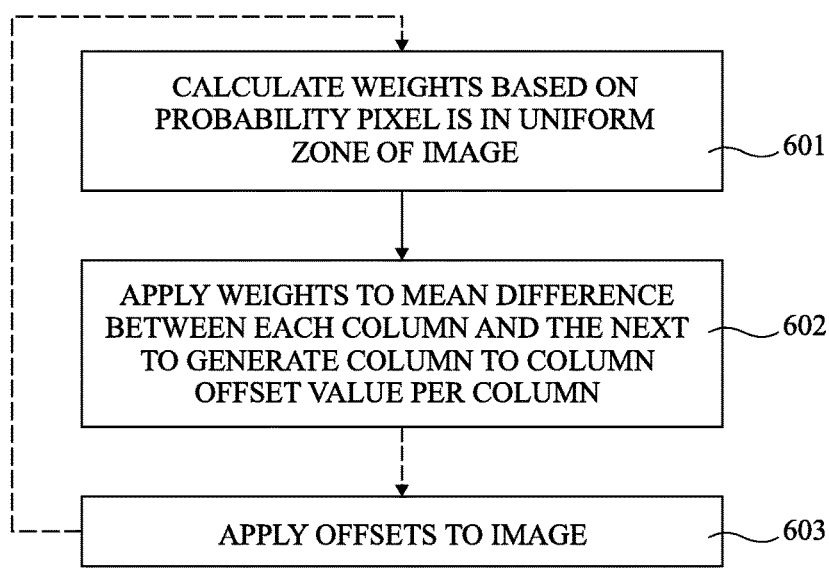
FIG. 6 is a flow diagram illustrating operations in a method of removing column residues according to an example embodiment.

FIG. 6 is a flow diagram illustrating operations in a method of calculating column residue offsets be applied to an image, for example to the corrected image $I_C$ resulting from the process described above. These operations are for example implemented by the image processing block 112 of FIG. 3 discussed above.

In a first operation 601, weights $w_{x,y}$ are calculated for each pixel of each column of the image, based on an estimation of the uniformity in a local zone of the image defined by the neighbourhood of the pixel. The higher the uniformity, the higher the weight associated with the pixel, as the more likely it is that difference between columns is due to structural (fixed) column residue. For example, the calculation is based, for each pixel, on a 9 by 3 neighbourhood of pixels including the pixel in question, in other words on a rectangular zone defined by up to four pixels on the left and right sides of the pixel in question and up to one pixel above and below the pixel in question. The uniformity is estimated for example by calculating a local gradient and a local horizontal variance for the neighbourhood of each pixel. In some embodiments, the weights are calculated based on the image after the columns have been filtered vertically by a low pass filter, as will be described in more detail below.

In a subsequent operation 602, the mean difference between each column and the next is weighted by a corresponding weight, giving for each column a corresponding column to column offset value $\nabla Col_w(x)$. For example, the column to column offset vector $\nabla Col_w(x)$ is determined based on the following equation:

$$\nabla Col_w(x) = \frac{1}{m}\sum_{y=1}^{m} w_{x,y}(I_{x+1,y} - I_{x,y})$$

where $w_{x,y}$ are the weights calculated in operation 601 above, $I_{x+1,y}$ is the pixel value in position y of the next column x+1 and $I_{x,y}$ is the pixel value in position y of the current column x. In other words, each column to column offset value $\nabla Col_w(x)$ is determined as an average of the weighted differences between the pixel values of the column x and of the column x+1. The last column offset value of the row is for example set to 0.

As a further operation, since the column to column offset only represents the forward offset between a column and the next one, each term of the offset vector is for example integrated backwards, i.e. by starting from the last but one term, each column offset value being added cumulatively to the preceding one until reaching the first term, to provide a final column offset term OffCol(x) as follows:

OffCol(n)=0, and OffCol(x-1)=OffCol(x)+$\nabla Col_w$(x-1)

These offset values for example provide the column residue offset values labelled 510 in FIG. 5, which are for example summed with the other offsets to provide the summed offset values SOV(x,y) to be subtracted from the raw image $I_B$ or from a subsequent raw image. Alternatively, in a subsequent operation 603, the offset values are applied to the image $I_C'$ already corrected based on the column spread and 2D dispersion components $V_{COL}$, $I_{DISP}$, in order to generate a clean image $I_{CR}$. Furthermore, as represented by a dashed arrow in FIG. 6, in some embodiments the operations 601 and 602 are repeated one or more times based on the generated clean image in order to remove even more structural column residues.

Figure 7:
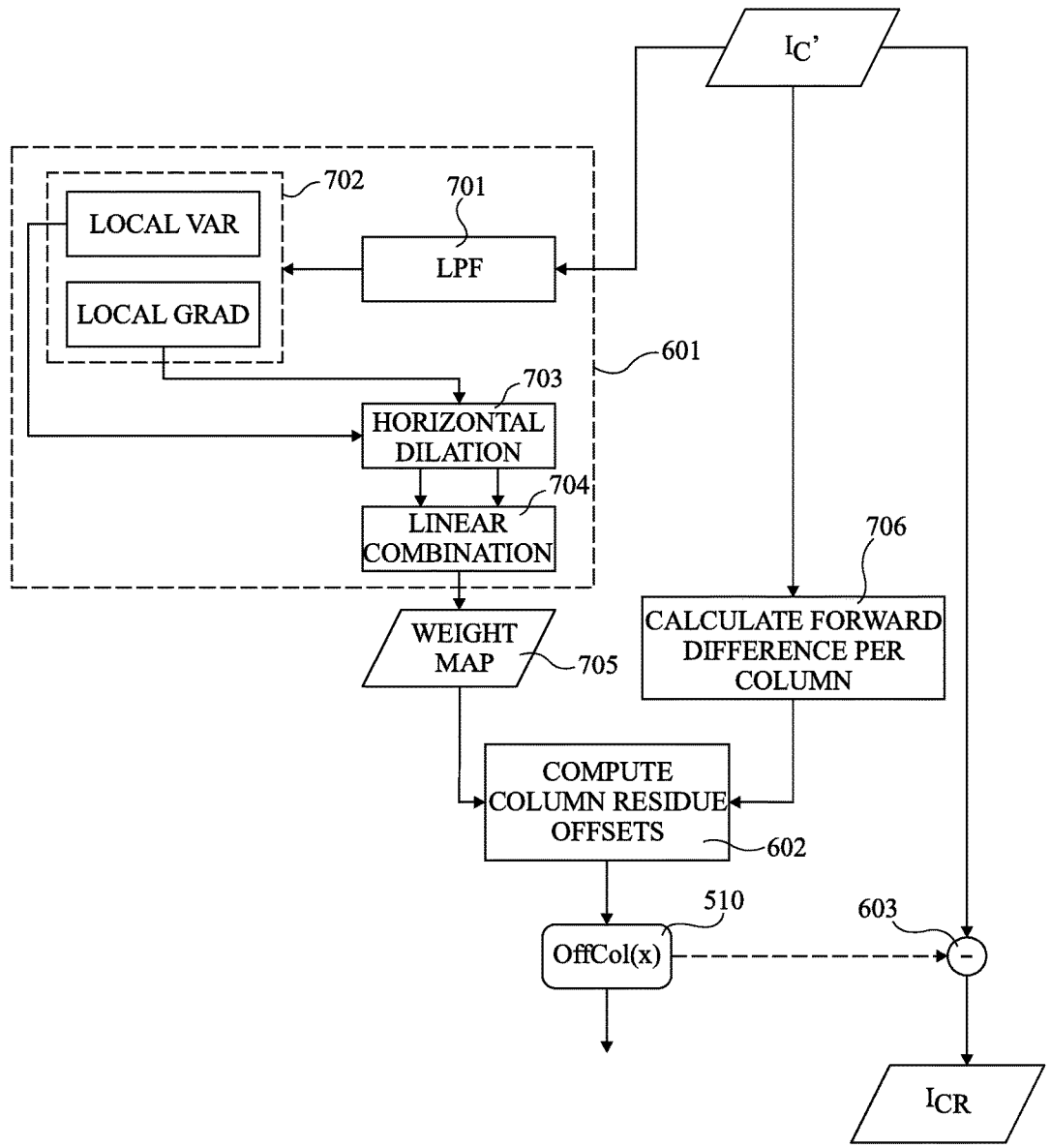
FIG. 7 is a flow diagram illustrating operations of FIG. 6 in more detail according to an example embodiment.

FIG. 7 is a flow diagram illustrating the operations of FIG. 6 in more detail according to an example embodiment.

As illustrated, the operation 601 of FIG. 6 of calculating weights based on the uniformity of the zone in which the pixel is present for example involves sub-operations 701 to 704.

Operation 701 involves applying a low pass filter vertically along the columns of the image. Applying such a low pass filter for example reduces the impact of fixed pattern noise (FPN) inherent of the image sensors. This filtering operation is optional. The filter is for example a Gaussian filter defined by a kernel size wG and its standard deviation a. In one example, the filter has a kernel size wG of 9 and a standard deviation of 2.

Operation 702 involves calculating a local gradient value $\tilde{P}^V$ and a local horizontal variance value $\tilde{P}^{VAR}$ for each pixel of the image.

The local gradient $\tilde{P}^V$ is for example determined based on the following equation:

$$\tilde{P}^V = \frac{1}{G_x I^2 + G_y I^2}$$

where $G_x$ and $G_y$ are the Sobel operators in x and y respectively, and I is the image, for example after being filtered in operation 701.

The local horizontal variance $\tilde{P}^{VAR}$ is for example determined based on the following equation:

$$\tilde{P}^{VAR} = \frac{1}{\sum_{f \in \vartheta}(\bar{I} - I(f))^2}$$

where $\vartheta$ is the horizontal neighbourhood of the pixel being considered, $\bar{I}$ is the average of the pixel values in the horizontal neighbourhood and I(f) is the corresponding pixel value within the horizontal neighbourhood. The horizontal neighbourhood $\vartheta$ for example has a size 2*wV+1 of three or mom pixels and for example up to 9 pixels, and can be generally defined as:

$\vartheta[I_{x-xV,y}, I_{x-wV+1,y}, \ldots, I_{x,y}, \ldots, I_{x+wV-1,y}, I_{x+wV,y}]$ In operation 703, horizontal morphological dilation is for example performed on each of the local horizontal variance and local gradient values, for example based on the following equations:

$\tilde{P}^{DIL\_VAR} = (\tilde{P}^{VAR} \oplus \vartheta')$ $\tilde{P}^{DIL\_V} = (\tilde{P}^V \oplus \vartheta')$ where ($\tilde{P} \oplus \vartheta'$) for a given pixel x is for example equal to max$\{\tilde{P}(x), x \in \vartheta'\}$ and $\vartheta'$ is a horizontal pixel neighbourhood of the pixel x. The neighbourhood $\vartheta'$ for example has a size 2*wD+1 of three or more pixels, and can be generally defined as:

$\vartheta' = [P_{x-xD,y}, P_{x-wD+1,y}, \ldots, P_{x,y}, \ldots, P_{x+wD-1,y}, P_{x+wD,y}]$ The horizontal morphological dilation has the effect of reducing the influence of the blur onto the weights computation (usually caused by the optical aberration) in presence of highly contrasted vertical structures in the scene, by extending to the horizontally neighbouring pixels the influence of zones with high horizontal gradient values and/or high variance values.

In operation 704, the values $\tilde{P}^{DIL\_V}$ and $\tilde{P}^{DIL\_VAR}$ are for example normalized for each column such that, for one column, their summation is equal to 1. For example, these normalizations are computed based on the following equations:

$$P_{x,y}^{\nabla} = \frac{\tilde{P}_{x,y}^{DIL\_\nabla}}{\sum_x \tilde{P}_{x,y}^{DIL\_\nabla}}$$

$$P_{x,y}^{VAR} = \frac{\tilde{P}_{x,y}^{DIL\_VAR}}{\sum_x \tilde{P}_{x,y}^{DIL\_VAR}}$$

The weights $w_{x,y}$ are then for example determined by a linear combination of these normalized values $P_{x,y}^{\nabla}$ and $P_{x,y}^{VAR}$, giving an estimation of the uniformity in a local zone of the image defined by the neighbourhood of the pixel. In some embodiments, the gradient and variance values could be given equal influence, in which case the weights $w_{x,y}$ are for example determined by the following equation:

$$w_{x,y} = (P_{x,y}^{\nabla} + P_{x,y}^{VAR})/2$$

Alternatively, a different influence can be assigned to the gradients and variance values, by applying a scalar to each value. For example, the weights are determined by the following equation:

$$w_{x,y} = a \times P_{x,y}^{\nabla} + b \times P_{x,y}^{VAR}$$

where a and b are the scalars, and for example a+b=1. For example, choosing b to be greater than a, such as five or more times greater; a horizontal variance influence can be applied.

Referring again to FIG. 7, the weights $w_{x,y}$ form a weight map 705. In some embodiments, a weight is computed for every pixel of the image, while in other embodiments the operations 701 to 704 can be adapted to provide weights for only certain pixels, for example the pixels of every second, third or fourth row of the image, in order to reduce the computation time.

The subsequent operation is the operation 602 of FIG. 6, in which the column to column offsets $\nabla Col_w(x)$ are for example determined based on the above equation:

$$\nabla Col_w(x) = \frac{1}{m} \sum_{y=1}^{m} w_{x,y}(I_{x+1,y} - I_{x,y})$$

The terms $(I_{x+1,y} - I_{x,y})$ are forward differences between the column x and the column x+1, and these are for example calculated in an operation 706 of FIG. 7, based on the image $I_C'$. In some embodiments, only the forward differences that are under a certain threshold are considered in the calculation of the average for a given column. Indeed, values over a certain threshold can be considered to represent a vertical edge in the image scene which should not be removed. The threshold is for example chosen to be slightly greater than the maximum expected column difference between one column and the next. The offset values OffCol(x) are then for example calculated by integrating the values $\nabla Col_w(x)$, as explained above.

As mentioned above, the offset values of the vector OffCol(x) can for example be subtracted from the image $I_C'$ in an operation 603 to generate a clean image $I_{CR}$ in which column artefacts have been removed from the image, or they can be added to other offset as represented in FIG. 5.

An advantage of the offset correction methods as described herein is that they do not require the use of a mechanical shutter, and they have been found to be very effective.

In particular, the present inventors have found that, in pixel arrays of the type described herein, pixel and reference pixel variations due to temperature follow the Arrhenius equation, wherein the activation energy is essentially the same for all pixels, and essentially the same for all reference pixels, meaning that interpixel dispersion can be considered to be fully, or at least essentially, contained within the constant pre-factors of the Arrhenius equation describing each pixel. Therefore, by decomposing the offsets introduced by the pixel array into 1D and 2D components and deriving the scale factors α and β to represent these components, effective offset correction can be achieved without the use of a mechanical shutter.

Having thus described at least one illustrative embodiment, various alterations, modifications and improvements will readily occur to those skilled in the art.

For example, while a specific example of a microbolometer is described in relation to FIG. 2, it will be apparent to those skilled in the art that the methods described herein could be applied to various other implementations of a microbolometer, or to other types of IR imaging devices.

Furthermore, it will be apparent to this skilled in the art that the various operations described in relation to the various embodiments could be performed, in alternative embodiments, in different orders without impacting their effectiveness. For example, the order in which the scale factors α and β are determined could be changed.

The invention claimed is:

1. A method of image processing comprising:
receiving, by a processing device, an input image captured by a pixel array sensitive to infrared radiation, the pixel array having a plurality of pixel columns, each pixel column being associated with a corresponding reference pixel;
determining, based on the input image and on a column component vector representing column spread introduced by the reference pixels, a first scale factor by estimating a level of said column spread present in the input image;
generating column offset values based on the product of the first scale factor with the values of said vector;
determining, based on the input image and on a 2D dispersion matrix representing 2D dispersion introduced by the pixel array, a second scale factor by estimating a level of said 2D dispersion present in the input image;
generating pixel offset values based on the product of the second scale factor with the values of said matrix; and
generating a corrected image by applying said column offset values and said pixel offset values.

2. The method of claim 1, further comprising generating a partially corrected image based on said column offset values, wherein said second scale factor is generated based on said partially corrected image.

3. The method of claim 1, wherein said column vector and dispersion matrix are determined based on a reference image representing offsets introduced by the pixel array and the associated reference pixels.

4. The method of claim 1, wherein said corrected image is generated based on the equation:

$$I_C' = I_B(x,y) - \alpha I_{COL}(x,y) - \beta I_{DISP}(x,y)$$

where $I_B(x,y)$ is the input image, α is the first scale factor, $I_{COL}(x,y)$ is a matrix comprising in each of its rows the column vector, β is the second scale factor, and $I_{DISP}(x,y)$ is the dispersion matrix.

5. The method of claim 1, wherein:
the column vector ($V_{COL}$) represents the difference between a first column vector ($I_{COL}^{T0}$) based on a first reference image taken at a first ambient temperature (T0) and a second column vector ($I_{COL}^{T1}$) based on a second reference image taken at a second ambient temperature (T1);
the dispersion matrix ($I_{DISP}$) represents the difference between a first dispersion matrix ($I_{DISP}^{T0}$) based on said first reference image and a second dispersion matrix ($I_{DISP}^{T1}$) based on said second reference image.

6. The method of claim 5, wherein said corrected image ($I_C'$) is generated based on the equation:

$$I_C' = I_B(x,y) - I_{COL}^{T0}(x,y) - I_{DISP}^{T0}(x,y) - \alpha(I_{COL}'(x,y)) - \beta(I_{DISP}'(x,y))$$

where $I_B(x,y)$ is the input image, $\alpha$ is the first scale factor, $I_{COL}^{T0}(x,y)$ is a matrix comprising in each of its rows the first column vector, $I_{COL}'(x,y)$ is a matrix equal to $I_{COL}' = (I_{COL}^{T1} - I_{COL}^{T0})$, where $I_{COL}^{T1}$ is a matrix comprising in each of its rows the second column vector, $\beta$ is the second scale factor, $I_{DISP}^{T0}(x,y)$ is the first dispersion matrix and $I_{DISP}'(x,y)$ is a matrix equal to $I_{DISP}' = (I_{DISP}^{T1} - I_{DISP}^{T0})$, where $I_{DISP}^{T1}$ is the second dispersion matrix.

7. The method of claim 1, further comprising determining based on said corrected image ($I_C'$) at least one column residue offset value.

8. The method of claim 7, wherein determining said at least one column residue offset value comprises:
determining weights associated with at least some of the pixels of said corrected image, the weights being generated based on an estimation of the uniformity of the neighborhood of each of said at least some pixels;
calculating, for each of the at least some pixels, the difference with respect to a pixel value in a corresponding row of an adjacent column; and
applying the weights to said differences and integrating the weighted differences to generate the at least one column residue offset value.

9. The method of claim 8, wherein the estimation of the uniformity of the neighborhood of each of said at least some pixels is based on a gradient value ($P_{x,y}^{\nabla}$) and on a horizontal variance value ($P_{x,y}^{VAR}$) calculated for each neighborhood.

10. The method of claim 1, wherein determining the first scale factor comprises:
applying a high-pass filter along the rows of the image;
applying said high-pass filter to the column vector; and
determining column averages of the filtered image, wherein the first scale factor is determined based on a minimization of the differences between the column averages of the filtered image and the filtered values of the column vector.

11. The method of claim 1, wherein the first scale factor $\alpha$ is determined based on the following equation:

$$\alpha = \frac{\sum_x \left( \frac{1}{m} \sum_y T(I_B(x,y)) \times T(V_{COL}(x)) \right)}{\sum_x T(V_{COL}(x)) \times T(V_{COL}(x))}$$

where T( ) represents a high pass filter applied to the column vector $V_{COL}$ and to the rows of the input image $I_B(x,y)$.

12. The method of claim 1, wherein determining the second scale factor comprises:
determining, for each pixel of the input image and for each element of the dispersion matrix, a gradient value based on at least one adjacent pixel, wherein the second scale factor is determined based on a minimization of the difference between the gradients of the input image and the gradients of the dispersion matrix.

13. The method of claim 1, wherein the second scale factor $\beta$ is determined based on the following equation:

$$\beta = \frac{\sum (\nabla_x I_B \cdot \nabla_x I_{DISP} + \nabla_y I_B \cdot \nabla_y I_{DISP})}{\sum ((\nabla_x I_{DISP})^2 + (\nabla_y I_{DISP})^2)}$$

where $I_B$ is the input image, $I_{DISP}$ is the dispersion matrix, $\nabla x$ is the pixel gradient value between adjacent pixels in the row direction in the input image, and $\nabla y$ is the pixel gradient value in the column direction in the input image.

14. The method of claim 1, wherein said column and pixel offset values are applied to a further input image.

15. The method of claim 1, further comprising determining a gain correction value ($\gamma$) by resolving the following minimization problem:

$$\gamma = \underset{\gamma}{\mathrm{argmin}}(\mathrm{var}(\mathrm{Gain} \times I_C' - \gamma \times \mathrm{Gain})),$$

where var is the variance, $I_C'$ is the corrected image, and Gain is a gain matrix.

16. An image processing device comprising:
a processing device adapted to:
receive an input image captured by a pixel array sensitive to infrared radiation, the pixel array having a plurality of pixel columns, each pixel column being associated with a corresponding reference pixel;
determine, based on the input image and on a column vector representing column spread introduced by the reference pixels, a first scale factor by estimating a level of said column spread present in the input image;
generate column offset values based on the product of the first scale factor with the values of said column vector;
determine, based on the input image and on the dispersion matrix representing 2D dispersion introduced by the pixel array, a second scale factor by estimating a level of said 2D dispersion present in the input image;
generate pixel offset values based on the product of the second scale factor with the values of said matrix;
generate a corrected image by applying said column offset values and said pixel offset values; and
a memory storing the column vector and the dispersion matrix.

* * * * *